(12) United States Patent  
Long et al.

(10) Patent No.: US 8,181,827 B2
(45) Date of Patent: May 22, 2012

(54) SEASONING DISPENSER

(75) Inventors: Robert Long, Glenview, IL (US);
Edward Eaton, Eola, IL (US); Brian W. Mathews, Waterman, IL (US); Eric Larson, Pecatonica, IL (US)

(73) Assignee: Prince Castle, LLC, Carol Stream, IL (US)

( * ) Notice: Subject to any disclaimer, the term of this patent is extended or adjusted under 35 U.S.C. 154(b) by 774 days.

(21) Appl. No.: 12/352,450

(22) Filed: Jan. 12, 2009

(65) Prior Publication Data

US 2010/0176157 A1 Jul. 15, 2010

(51) Int. Cl.
*B67D 7/76* (2010.01)
(52) U.S. Cl. .................... 222/189.02; 222/565
(58) Field of Classification Search ........ 222/189.02–189.05, 565, 191, 222/323, 441, 457.5, 142.1–142.9
See application file for complete search history.

(56) References Cited

U.S. PATENT DOCUMENTS

| | | | | |
|---|---|---|---|---|
| 2,815,153 A * | 12/1957 | McCarthy | | 222/441 |
| 4,006,842 A * | 2/1977 | Bassignani | | 222/43 |
| 4,961,521 A * | 10/1990 | Eckman | | 222/142.5 |
| 5,271,535 A * | 12/1993 | Fridman et al. | | 222/427 |
| 5,746,355 A * | 5/1998 | Wold | | 222/189.02 |
| 5,934,573 A * | 8/1999 | Weterrings et al. | | 239/650 |
| 7,143,909 B2 * | 12/2006 | Peterson et al. | | 222/83 |
| 7,494,030 B2 * | 2/2009 | Bennett | | 222/480 |
| 2007/0084886 A1 * | 4/2007 | Broen et al. | | 222/565 |
| 2007/0290009 A1 * | 12/2007 | Fuchs | | 222/480 |

* cited by examiner

*Primary Examiner* — Lien Ngo
(74) *Attorney, Agent, or Firm* — Joseph P. Krause; Kelly & Krause LP (57) ABSTRACT

Fixed amounts of granular and granulated seasonings are dispensed from a rotatable disc that lies flat or horizontal and which includes a through-hole or void. The void is gravity-filled with granulated seasonings from a hole in the bottom of a hopper. A screen below the disc is formed to have open, through-holes and a solid land. The void in the disc fills with granules when the void is beneath a hole in the hopper but over a solid land thus preventing granules to spill through the disc. Rotation of the disc moves the void away from the land, allowing granules in the void to fall through holes in the screen. A gasket provides a seal between the disc and the hopper. The disc is rotated back and forth around its axis by vertical movement of an actuator about the horizontal hinge.

19 Claims, 8 Drawing Sheets

SEASONING DISPENSER

TECHNICAL FIELD

This invention relates to a dispenser for food seasonings that include but which are not limited to salt, pepper, grated onion and grated cheeses, garlic and others. More particularly, this invention relates to dispensing and dispensers for granular seasonings.

BACKGROUND

It is well known that most restaurants and food services strive to maintain product consistency, reduce preparation time and control production costs. It is also well known that many of the products produced in restaurants and food services are prepared using various types of seasonings.

Some seasonings are applied simply by tossing them onto the food product. Other seasonings are applied using handheld shakers. In either case, the amount of the seasoning applied is inconsistent and the seasoning distribution across a food product is not uniform. Stated another way, seasoning application is highly operator-dependant. Product consistency inevitably varies depending on who prepares a seasoned food product.

Varying and/or uncontrollable food quality is anathema to most restaurants, but especially so to restaurant chains, which strive for consistent product characteristics and quality from outlet to outlet. A seasoning dispenser able to provide consistent and controllable seasoning applications would be an improvement over the prior art.

DETAILED DESCRIPTION

Figure 1:
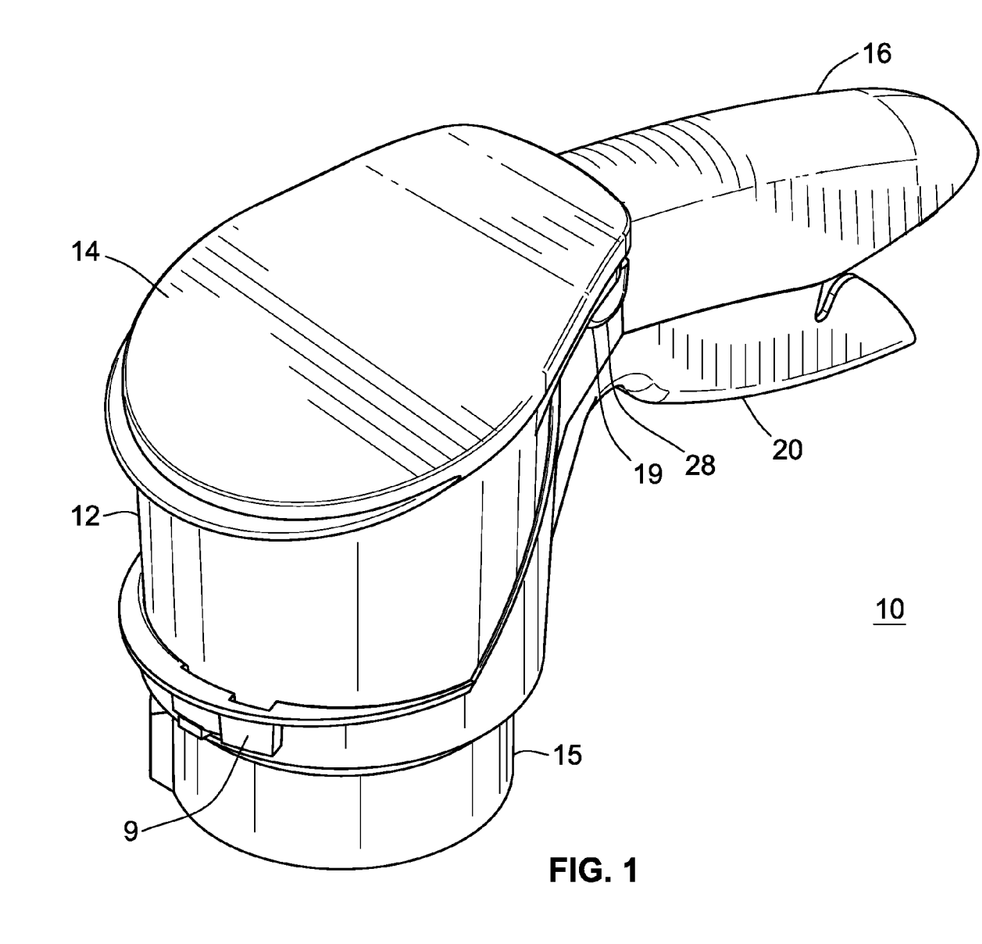
FIG. 1 is a perspective view of a preferred embodiment of a seasoning dispenser.

FIG. 1 is a perspective view of a preferred embodiment of a seasoning dispenser 10. The dispenser 10 is comprised of a hopper 12 which preferably has an open top covered by a removable lid 14. The hopper 12 is removably attached to a dispenser body or base, identified by reference numeral 15. The attachment of the hopper 12 to the base 15 is best seen in the exploded views, which are described below.

The lid 14 is preferably attached to the hopper 12 through a hinge, not shown in FIG. 1 because of the angle from which the dispenser 10 is viewed in the figure. The lid hinge allows the lid 14 to be opened and closed in order to permit the hopper 12 to be re-filled with seasoning. In alternate embodiments, the lid 14 is snapped into place over a lip formed into or along the top edge (not shown) of the hopper 12. In yet another embodiment, the lid 14 is hingedly attached to the dispenser handle 16. In yet another embodiment, a single-use hopper 12 is filled once and the top is sealed. When seasoning in the single-use hopper 12 is consumed or if it loses flavor, a new single-use sealed hopper 12 or a re-usable hopper 12 can be installed into the base 15 and the single-use hopper discarded.

Figure 2:
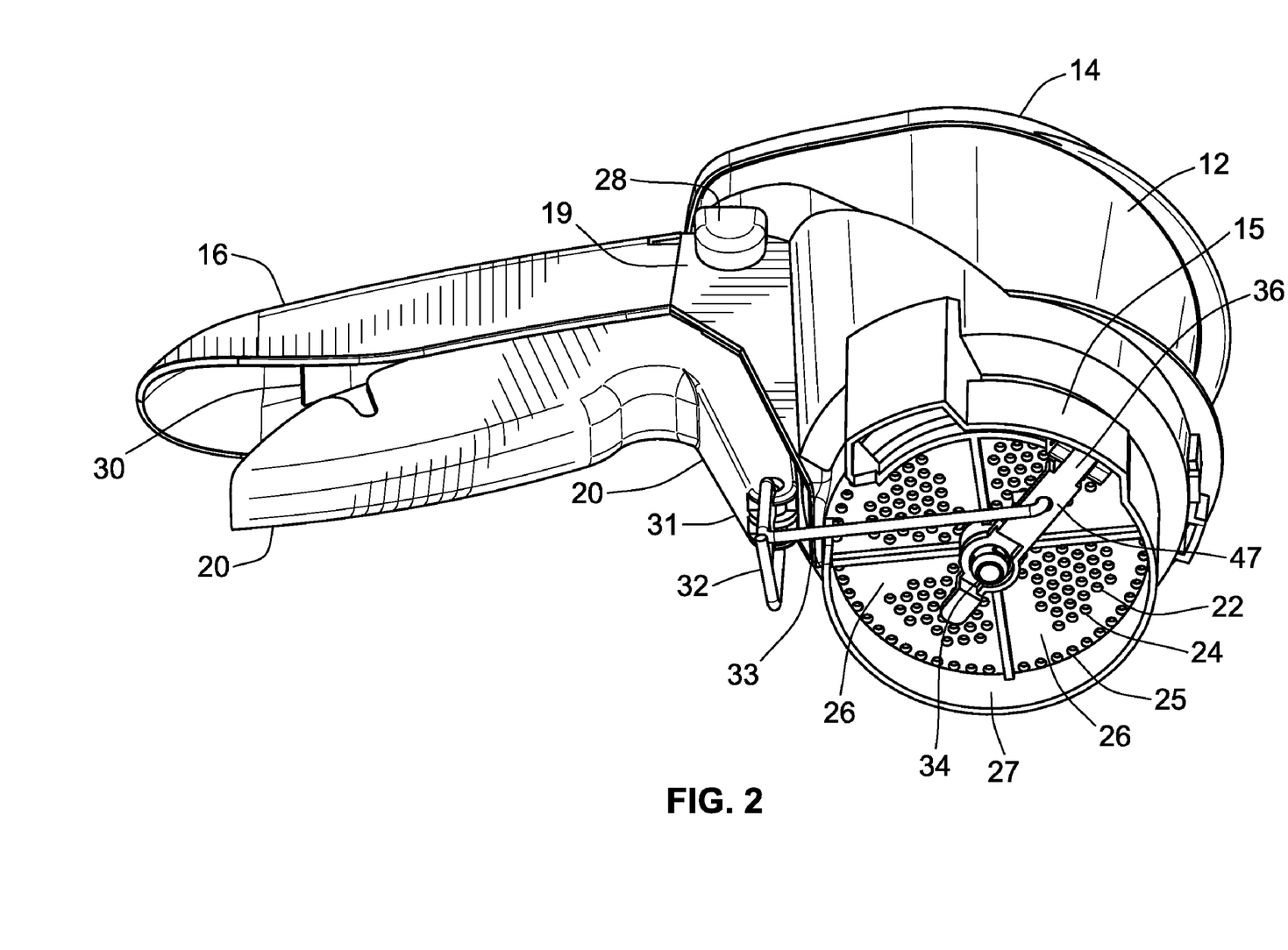
FIG. 2 is a perspective view of the bottom of the seasoning dispenser shown in FIG. 1.

Seasonings are dispensed from the dispenser 10 by a user operating an L-shaped actuator 20, best seen in FIG. 2. The vertex 19 of the actuator 20 is provided with a pair of hinge pins 29 (See FIG. 4.) that extend outwardly from the body of the actuator and which ride in actuator hinge pin receptacles 28. Neither the L-shape of the actuator 20, the hinge pins 29 nor the receptacles 28 are visible in FIG. 1 but can be seen in the other figures described below.

The actuator 20 is preferably molded plastic. The hinge pins 29, which extend outwardly from the sides of the actuator 20 and which allow the actuator to rotate are preferably formed during the same molding process and in a sense, become part of the actuator 20.

The handle 16 and the dispenser base 15, which are also best seen in the exploded figures are also preferably molded plastic. The aforementioned actuator hinge receptacles are therefore also preferably formed during the same molding process. In a sense, the receptacles become part of the molded handle/base structure.

FIG. 2 is a perspective view of the seasoning dispenser 10 looking upward toward the bottom of the dispenser 10 including a granular dispensing screen 22 through which dispensed seasonings pass. The terms, granular dispensing screen, dispensing screen and screen are used interchangeably.

FIG. 2 shows that the overall shape of the actuator 20 can be seen to resemble the upper case letter L, the long arm of which is beneath the handle 16, the short arm of which extends downward. In addition to showing the granule dispensing screen 22, FIG. 2 also shows an actuator return spring 30, and a torque arm 36 coupled to the bottom end 31 through a connecting rod 33.

The torque arm 36 is connected to the spindle, which is also referred to interchangeably herein as an axis or central axis 34, of a rotatable, seasoning-measuring disc, not seen in FIG. 1 or FIG. 2 because it is above the screen 22. The axis 34 extends downwardly from the seasoning measuring disc and through the screen 22 as shown. Rotation of the torque arm thus effectuates a corresponding rotation of the seasoning measuring disc.

The dispensing screen 22 is preferably formed as part of the base 15 and handle 16, to reduce manufacturing costs, simplify assembly of the dispenser 10 and improve reliability. In an alternate embodiment the dispensing screen 22 can be formed as a separate part that fits inside the dispenser base 15.

The dispensing screen 22 has several round seasoning-dispensing through-holes 24. The terms seasoning-dispensing through-holes, dispensing through-holes and holes are used interchangeably.

Seasoning dispensing through-holes 24 are grouped or clustered together between un-perforated areas referred to herein as "lands" that are identified in the figures by reference numeral 26. Granules from the seasoning measuring disc fall through the seasoning dispensing through-holes 24 and onto a food product. The lands 26 are preferably solid to strengthen the screen 22 but more importantly to stop granules from flowing out of the dispenser 10 when the actuator 20 is "down," at its initial or starting position.

Some granules from the seasoning-measuring disc can migrate to the disc's perimeter and cause the disc to bind. The screen 22 is therefore also provided with additional by-pass dispensing holes 25 that are formed into the screen 22 and located just inside the perimeter 27 of the screen 22. In the preferred embodiment, the by-pass holes 25 are the same size and shape as the seasoning dispensing through-holes 24. As described below, the screen perimeter-located by-pass holes 25 provide an exit pathway for granules that miss one of the seasoning dispensing through-holes 24. The bypass holes thus reduce the likelihood that granules will accumulate above the screen 22 and jam the rotating dispensing disc. In an alternate embodiment, the bypass holes 25 are larger than the seasoning-dispensing through-holes 24. In yet another embodiment, the by-pass holes 25 are not holes per se but are formed as open slots, not shown, or sections of an arc that are open and which follow the curvature of the inside of the body 15, also not shown. The width of the slots or of the open arc sections, are selected to allow granules to fall through them. For purposes of claim construction, by-pass holes should be considered to include at least holes of all cross sectional shapes and diameters as well as straight slots and arcuate-shaped slots.

It can be seen from FIG. 2 that when the long arm of the L-shaped handle actuator 20 is pulled upwardly, the actuator 20 pivots on the hinge pins 29 located at the vertex 19. Translation of the bottom end 31 of the short arm of the actuator 20 away from the base 15 and the screen 22 causes the connecting rod 33 to pull the torque arm 36. Rotation of the torque arm 36 around the axis 34 rotates a seasoning-measuring disc, described below and depicted in FIGS. 4, 5 and 6. Squeezing the handle actuator 20 upwardly thus causes the seasonings to be dispensed by causing the aforementioned disc to rotate from a starting position, through an angle to a second position. The return spring 30 in the handle 16 causes the actuator 20 to move back, downwardly from the handle 16, causing the bottom end 31 of the short end of the actuator 20 to move back toward the base 15 and toward the screen 22 and axis 34. The force provided by an operator and the return force provided by the return spring 30 thus enable the actuator to oscillate up and down, which causes the torque arm 36 to oscillate back and forth between a starting and ending position, which causes the disc, not shown in FIG. 2 to rotate between a starting and an ending position.

Figure 3:
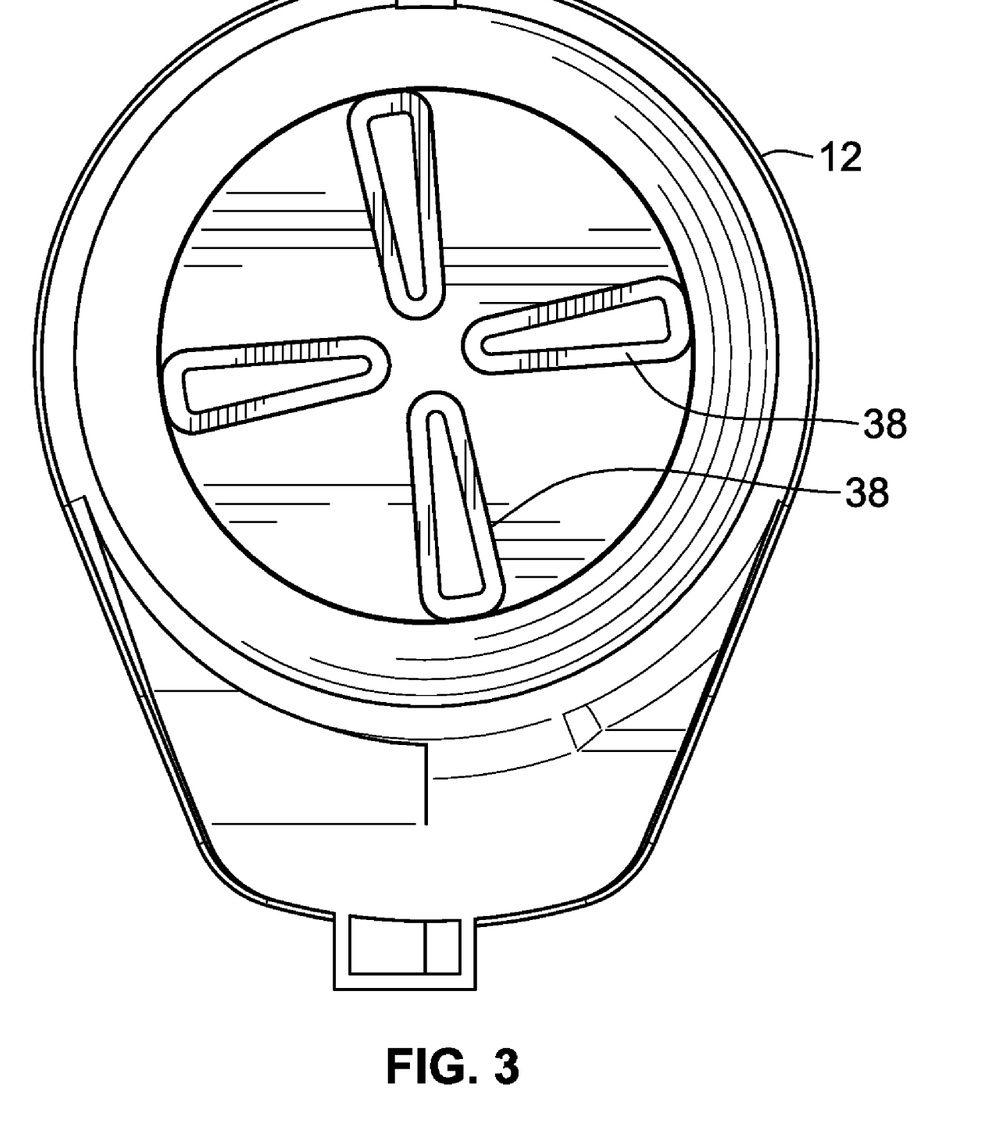
FIG. 3 is a bottom view of the seasoning dispenser shown in FIG. 1, looking into the top of the hopper.

Controlled measurement and distribution of seasonings from the dispenser 10 can be better understood by starting the description of the dispenser's operation with an inspection of FIG. 3, which is a bottom view of the hopper 12 showing several elongated openings 38 formed into the bottom of the hopper 12. The elongated openings 38 shown in FIG. 3 are substantially "pie-shaped" and the dimensions and shapes of them are empirically determined to allow granules stored in the hopper 12 to freely pass through the elongated openings 38 of the hopper 12.

Figure 4:
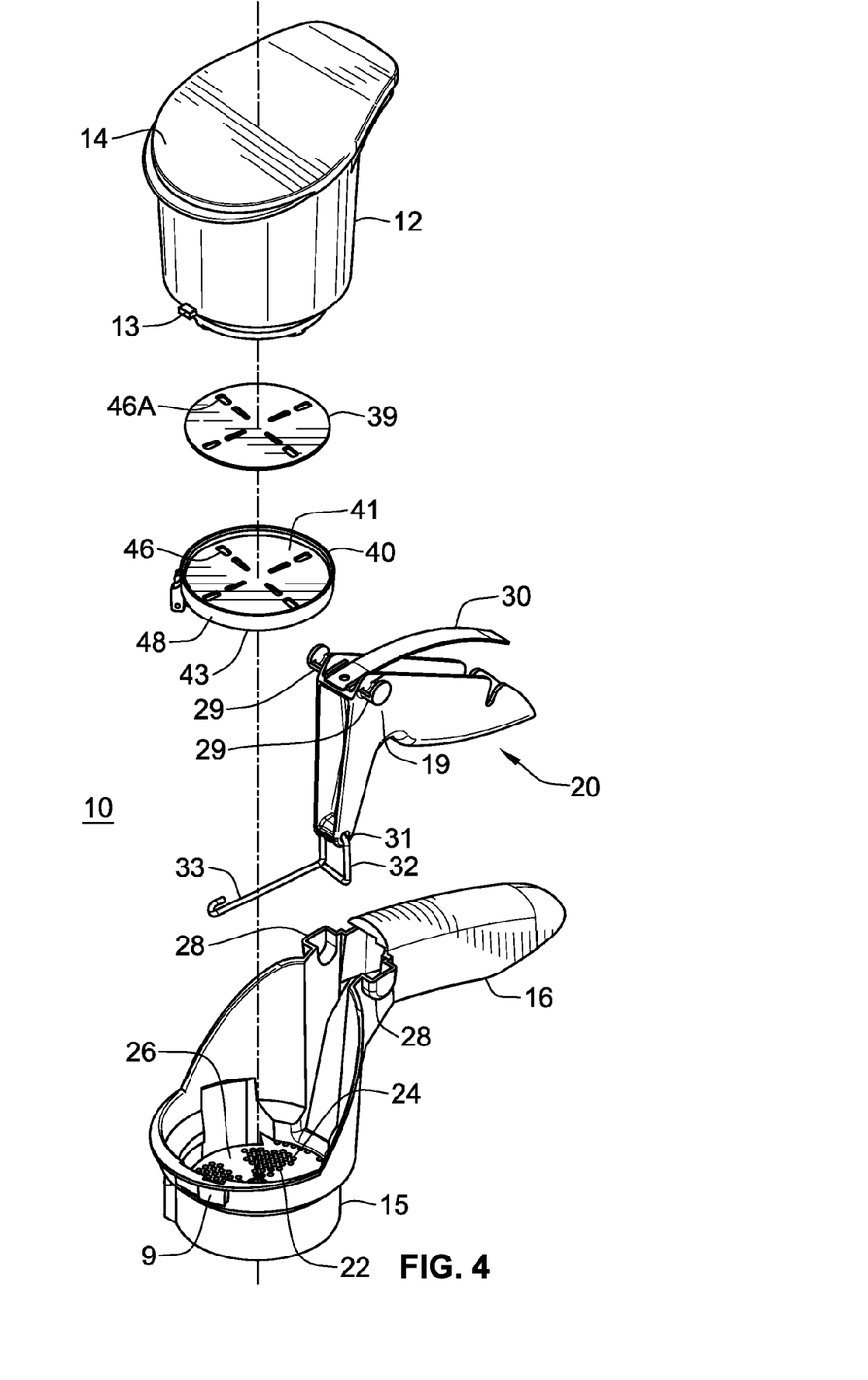
FIG. 4 is an exploded view of the seasoning dispenser shown in FIG. 1.

FIG. 4 is an exploded view of the seasoning dispenser 10 shown in FIG. 1, taken from above the hopper and looking downward toward the screen 22. The lands 26 between the groups of holes 24 can be seen in FIG. 4.

In FIG. 4, the hopper 12 is shown with the lid 14 in place. FIG. 4 also shows one of at least two engagement tabs 13 that are formed as part of the hopper 12 and which are sized and arranged to lockingly engage mating slots 9 formed into the interior of the base 15 and handle 16. One of the slots 9 in the base 15 that mate with a tab 13, is visible in FIG. 4.

The dispenser bottom or base 15 and the handle 16 are preferably molded at the same time to form a single unitary structure. The two actuator hinge pin receptacles 28 that receive the hinge pins 29 are also formed at the same time such that they are part of the body/handle structure. In an alternate embodiment, the base 15 and the handle 16 are formed separately and fastened together by an adhesive or other fastening mechanism, many of which are known to those of ordinary skill in the art.

Figure 5:
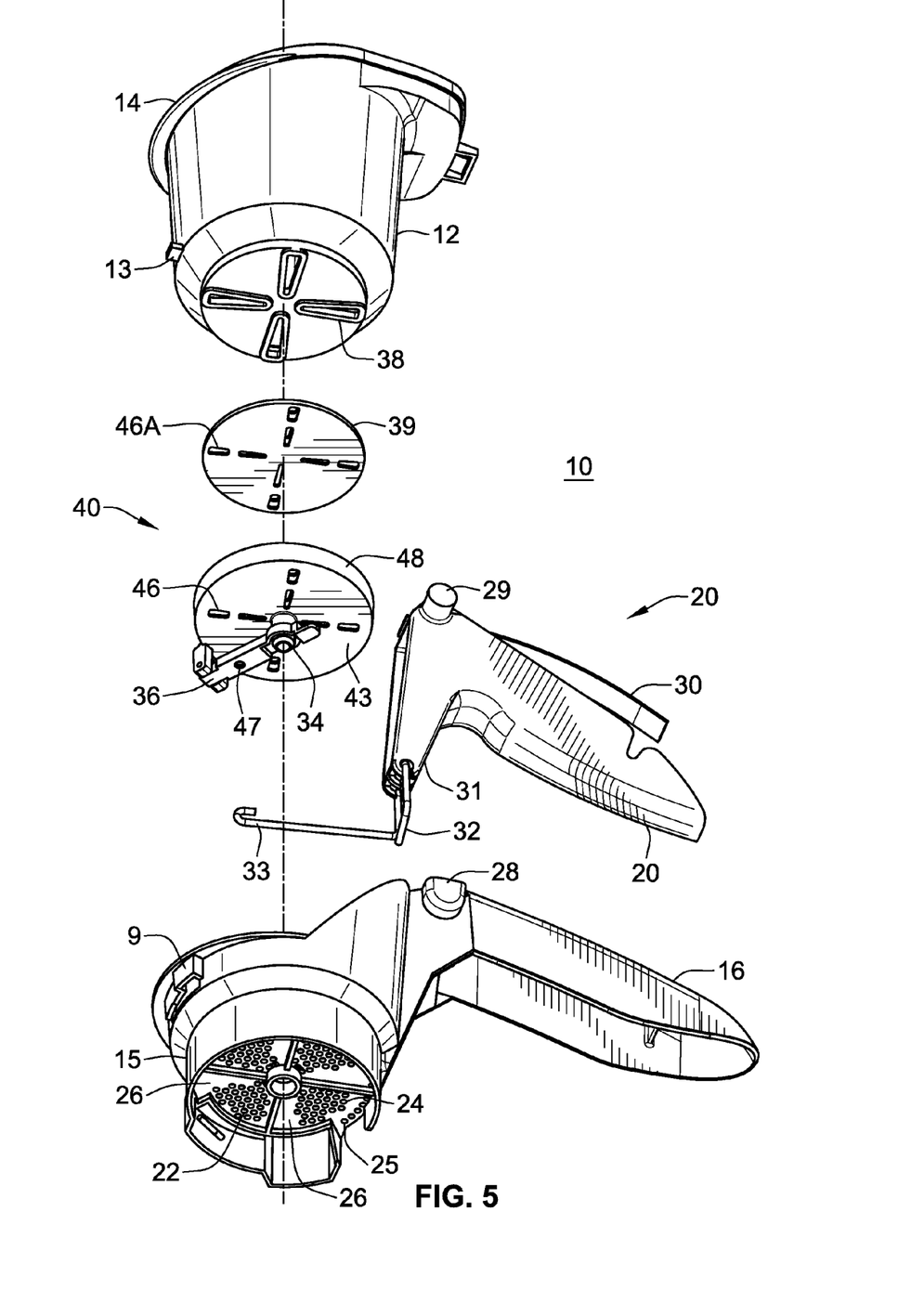
FIG. 5 is a second exploded view of the seasoning dispenser shown in FIG. 1 viewed from below the bottom of the dispenser.

FIG. 5 is another exploded view of the seasoning dispenser 10 albeit looking up toward the bottom of the body and the lower side of the screen 22 and lands 26. The elongated openings 38 in the bottom of the hopper 12 allow granules to pass from the hopper 12 and fall into voids 46 formed in the disc 40. FIG. 5 also shows the torque arm 36 depicted in FIG. 2 and which is attached to the axis 34 of the disc 40. In one embodiment, a U-shaped hook at the distal end of the connecting rod 33 engages a pivot hole 47 in the torque arm 36. Other embodiments use a threaded rod, one or more clevis pins and/or cotter pins, to attach the connecting rod 33 to appropriate holes formed into the torque arm 36. Oscillating angular movement of the torque arm 36 caused by the oscillating translation of the actuator bottom end 31 of the actuator 20, causes the seasoning-measuring disc 40 to oscillate around the axis 34.

It is important to note that the actuator 20 is depicted in FIG. 4 and FIG. 5 as being above the handle 16 and above the base 15 whereas in FIGS. 1 and 2, the actuator 20 is below the handle 16 and the short arm of the actuator 20 is outside the base 15. When the seasoning dispenser 10 is assembled, as it is in FIG. 1 and FIG. 2, the hinge pins 29 are in the receptacles 28 but the long part of the actuator 20 is below the handle 16; the short arm of the actuator 20 and its bottom end 31 is outside the base 15 as shown in FIG. 2.

FIG. 4 and FIG. 5 both show that seasoning measurement and seasoning dispensing is effectuated by the rotatable seasoning measuring member, preferably embodied as the disc 40 shown in the figures. The disc 40 shown in the figures is provided with several voids 46 that extend between the disc's top and bottom opposing surfaces. A filler portion or gasket 39 is attached to the top or upper surface of the disc 40. The gasket 39 is formed to have its own holes or voids 46A, which are aligned with the voids 46 in the disc 40 when the gasket 39 is installed in and affixed to the top surface 41 of the disc 40. As described below, the voids 46 in the disc 40 and the matching voids 46A in the gasket 39 effectively determine how much of a seasoning in the hopper 12 will be dispensed with each operation of the actuator 20.

When the dispenser 10 is assembled, the disc 40 with the gasket 39 attached thereto, are in the base 15 above the screen 22 but beneath the hopper 12. When the hopper 12 is in place in the base 15 and the disc 40 is at its starting, initial position, voids 46A in the gasket 39 and voids 46 in the disc 40 should be directly below the elongated openings 38 in the hopper 12 but also directly above the lands 26. Granules in the hopper 12 will thus fall through the elongated openings 38 in the bottom of the hopper 12 and fill voids 46 in the disc 40 and the voids 46A in the gasket 39. Since the bottom of the voids 46 and 46A are above the lands 26 when they are below the elongated openings 38, the voids 46 and 46A fill with granules, which are prevented from falling out of the voids 46 and 46A by the lands 26.

Pulling the actuator 20 upward causes the disc 40 and the granule-filled voids 46 and 46A therein to rotate away from the elongated openings 38 in the hopper 12 and away from the lands 26. As the disc 40 rotates away from its starting position, granules in the voids 46 and 46A fall through the holes 24 in the screen 22. Rotation of the disc 40 back and forth around its axis exerts centrifugal force on granules in the voids 46 and 46A. Centrifugal force on granules urges them outward. Granules that miss one of the holes 24 in the screen fall out one of the by-pass holes 25.

The top surface of the gasket 39 abuts extrusions that surround the elongated openings 38 in the hopper 12. The gasket 39 thus prevents granules from leaking out of the hopper 12 when the disc 40 is rotated away from its starting position. Granules are thus permitted to fall out of the hopper 12 only when the voids 46 are below the elongated openings 38.

Repeated actuation of the actuator 20 causes the disc 40 to rotate back and forth around axis 34. As voids 46 in the disc 40 pass underneath the elongated openings 38, they fill with granules, which then fall from the voids as the disc is rotated away from the disc's starting location. Repeated actuation of the actuator 20 will thus dispense the same or substantially the same amount of seasoning each time the disc 40 rotates.

Figure 6:
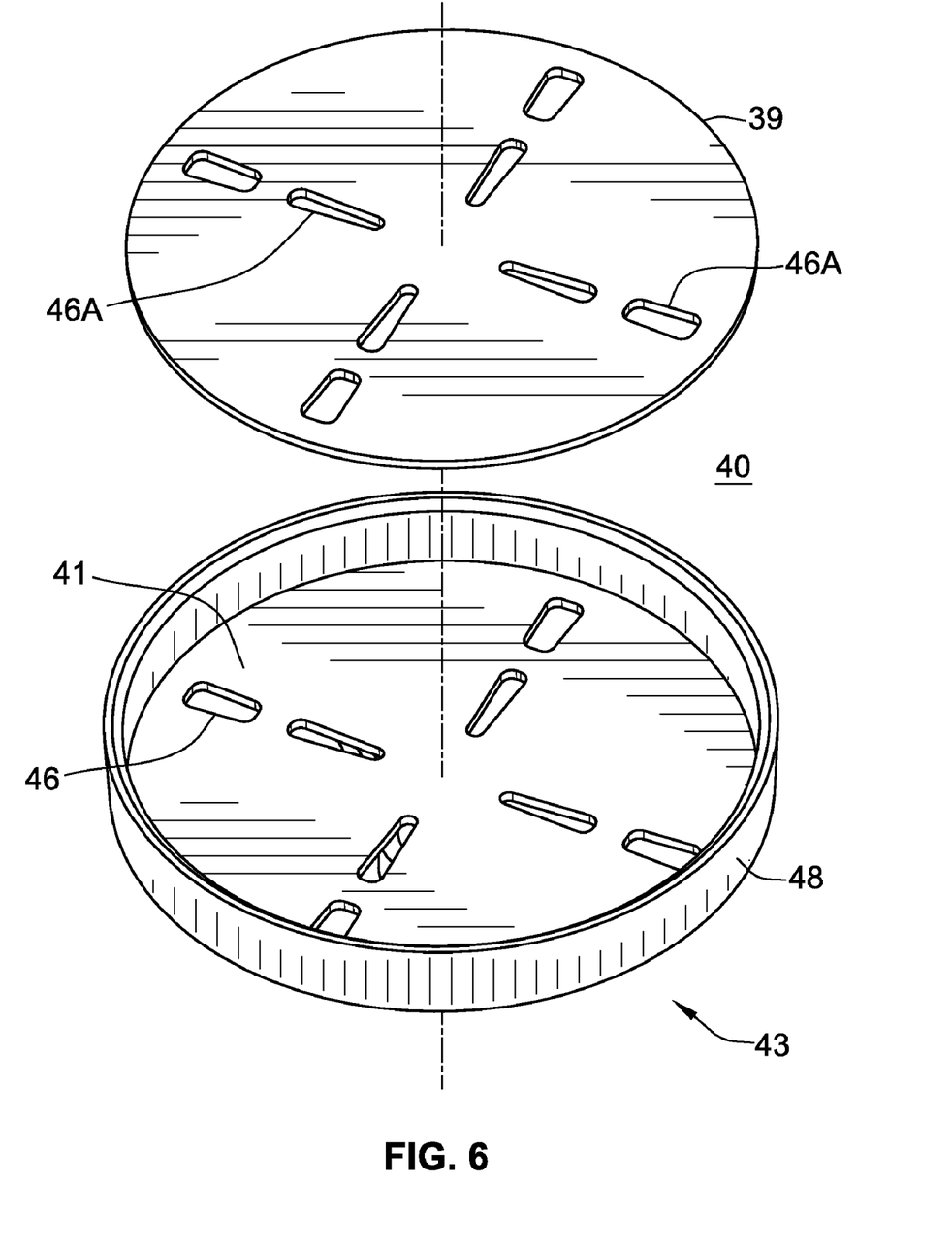
FIG. 6 is a perspective view of one embodiment of a rotatable measuring disc used in the seasoning dispenser depicted in FIGS. 1-5.

FIG. 6 is a perspective view of the rotatable disc 40. It shows that the disc has a first, top surface 41 and a second, bottom surface 43, which is not visible in FIG. 6. The disc 40 has a rim 48 at the perimeter, which extends upwardly from the top surface 41 of the disc 40. The rim 48 provides a relatively wide surface for the disc 40 to engage the interior of the base 15. The rim 48 also provides a structure that retains in place, the aforementioned pliable gasket 39.

The disc 40 can be seen to have a thickness, defined as the distance between the top surface 41 and the bottom surface 43. The thickness of the disc 40 and the area of a void 46 in the disc 40 determine the volume of seasoning that a void 46 can hold. Similarly, the thickness of the gasket 39 and the area of each void 46A in the gasket determine the volume of seasoning that a void 46A in the gasket 39 can hold. Thickness of the disc 40, thickness of the gasket 39, area of the disc void 46 and area of the gasket void 46A thus determine the volume of the granulated seasoning dispensed with each actuation of the actuator 20.

The gasket 39 is preferably formed from a soft or pliable material, such as neoprene rubber. The gasket 39 is also provided with holes that align with the voids 46 in the disc 40 to determine dispense volume. The gasket 39 is sized, shaped and arranged such that its top surface just meets the bottoms of the elongated openings 38 in the hopper 12 in order to close off the elongated openings 38 when the disc 40 rotates the voids 46 and 46A away from the openings 38.

Figure 7:
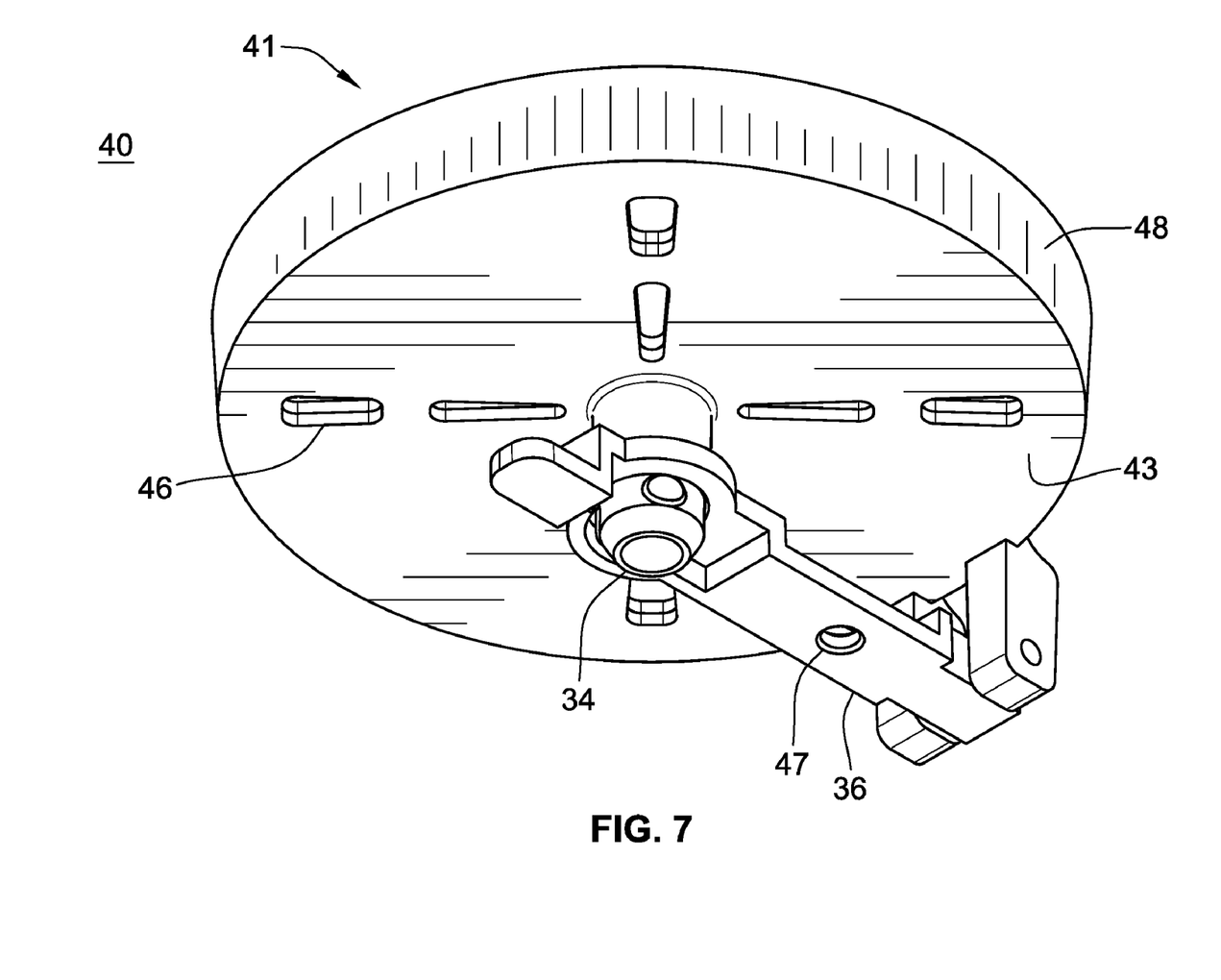
FIG. 7 is a bottom view of the disc shown in FIG. 6.

FIG. 7 is a bottom view of the disc 40 shown in FIG. 6. This view shows the bottom or second side of the disc 40 as well as the bottom or opposing side of the voids 46. FIG. 7 also shows the axis 34 and the torque arm 36, depicted in FIG. 5. The pivot hole 47 in the torque arm 36, which receives the connecting rod 33, is also clearly shown.

Figure 8:
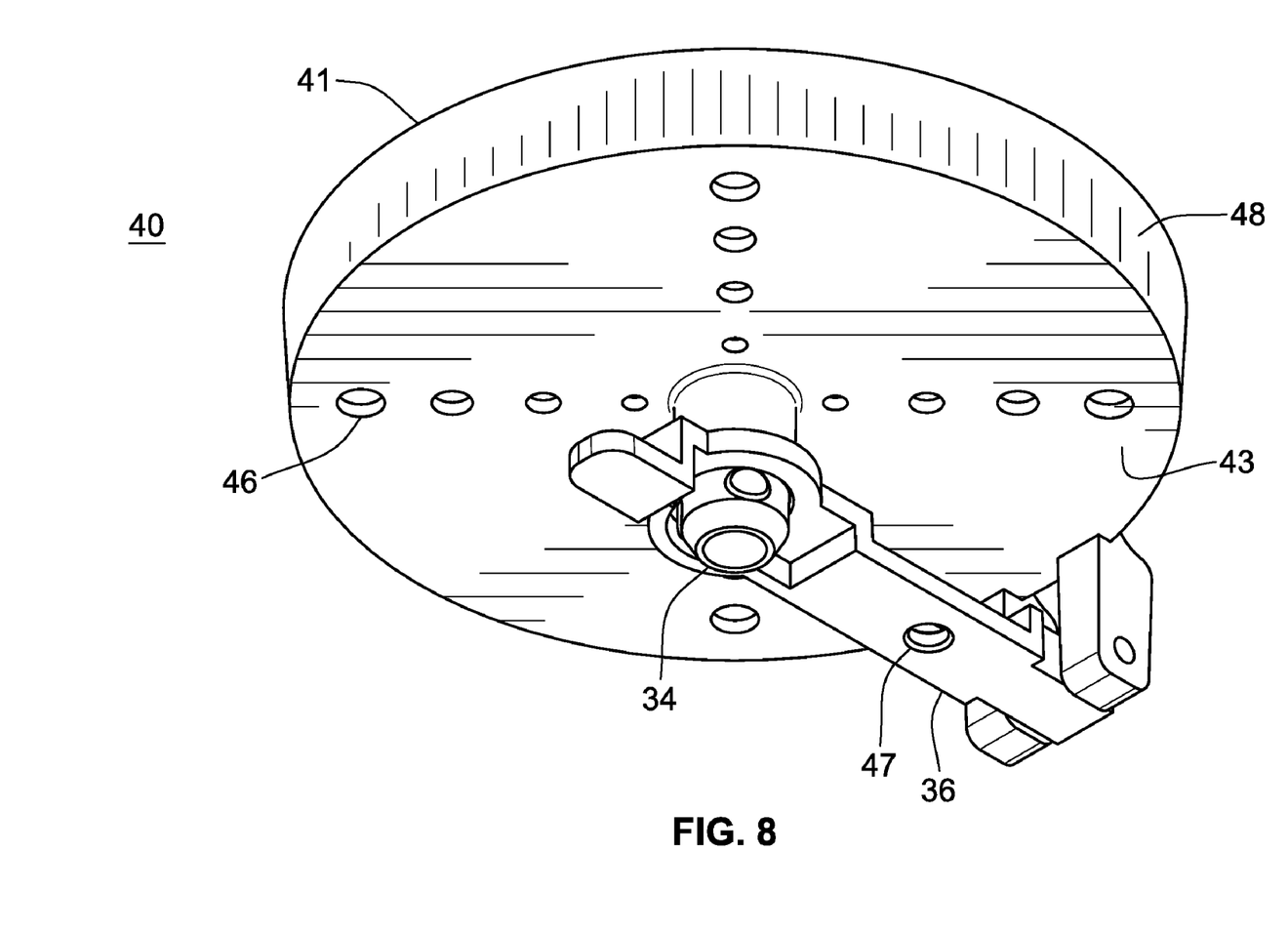
FIG. 8 is a bottom view of an alternate embodiment of a disc for use in the seasoning dispenser depicted in FIGS. 1-6.

FIG. 8 shows an alternate embodiment of the disc 40 that is identical to the disc shown in FIG. 6 and FIG. 7 except that the voids 46 shown in the disc 40 of FIG. 8 are of circular cross section. Voids 46 in the disc 40 and voids 46A in the gasket 39 can also be shaped as ovals, squares, triangles or other regular or irregular polygons.

For purposes of claim construction, the term rotatable seasoning measuring member includes the disc 40 depicted in the figures, however, the term should also be considered to include square, rectangular, elliptical or other planar bodies formed to have at least one void that can be filled with granules as described above. The rotatable seasoning member whether it is a disc, wheel, or other planar body, has an outer edge corresponding to a "circumference."

The hopper 12 is depicted in the figures as having substantially oval or "pie-shaped" elongated openings that are identified by reference numeral 38. Alternate equivalent embodiments include a hopper having only a single elongated opening as well as one or more round, oval, rectangular or other shaped holes. For claim construction purposes, terms that identify hopper openings that allow granules to pass through should be construed to include all of the above.

The screen 22 is depicted in the figures as having a hole pattern that is essentially the same. Alternate embodiments of the invention include screens having varying hole patterns as well as screens having different hole sizes. The dispensing holes 24 can also have more than one diameter. Different hole locations can also effectuate different granule distribution patterns, e.g., square, rectangular or circular granule distribution patterns. The term, "screen" should be construed to include at least all of the above alternate embodiments.

The lands 26 depicted in the figures are un-perforated sections separating or between clusters or groups of through-holes 24, however, in an alternate embodiment, the lands 26 are embodied as holes having much smaller diameters, i.e., holes too small for the nominal-sized granules in the hopper to pass through them. In yet another embodiment, the lands 26 are embodied as narrow slots, whose widths are too small for granules to fall through. For purposes of claim construction, the lands, should be construed to include not only the un-perforated areas shown in the figures but any other structure that does not allow at least the nominally-sized seasoning or seasoning granules to pass through the disc or other seasoning-measuring member, when it is being filled with granules from the hopper 12.

In a preferred embodiment, the return spring 30 is embodied as a flat or leaf-type spring. Alternate equivalent embodiments use a coil spring as well as a torsion spring and a constant-force spring to return the actuator 20 to its starting location.

While the foregoing description is of a preferred embodiment, the invention should not be construed to be limited to that which is described above. The true scope of the invention is defined by the appurtenant claims.

What is claimed is:

1. A granule dispenser comprised of:
   a granule hopper having a bottom with a plurality of openings through which granules can fall downwardly;
   a rotatable disc below the bottom of the hopper and having an axis of rotation, the disc having a top surface and a bottom surface and a thickness, the disc also having a plurality of voids (disc voids) angularly equidistant from each other around the axis of rotation, each void having an area and extending through the rotatable disc and
   a pliable gasket formed of a pliable material, the pliable gasket being located between the top surface of the rotatable disc and the bottom of the hopper and having a thickness, the gasket having a plurality of voids (gasket voids) that extend through the pliable gasket, each gasket void having an area, each gasket void being aligned with a corresponding disc void;
   thickness of the disc, areas of the disc voids, thickness of the pliable gasket and areas of the gasket voids being sized, shaped and arranged to determine the volume of material dispensed by rotation of the disc around its axis.

2. The dispenser of claim 1 wherein the pliable gasket is attached to the top surface of the rotatable disc, at least one of: the gasket thickness and the bottom of the granule hopper, being configured such that a top surface of the gasket meets the bottom of the hopper such that the gasket closes the plurality of openings in the bottom of the hopper by rotation of the disc and gasket around the axis of rotation of the disc.

3. The dispenser of claim 2, further comprised of a screen below the second side of the disc, the screen having a plurality of granule dispensing holes separated into a plurality of granule dispensing hole groups, the granule dispensing hole groups being defined by a land area between and separating adjacent granule dispensing hole groups, the land area being an area through which granules are unable to pass, the granule dispensing hole groups being angularly equidistant from each other around the axis of rotation, the land areas being angularly equidistant from each other around the axis of rotation.

4. The dispenser of claim 3, wherein the rotatable disc has a perimeter and a rim, the rim extending upwardly from the top surface of the disc at the perimeter, the rim being configured to retain the gasket.

5. The dispenser of claim 4, wherein the screen is substantially round and has an outer edge around the dispensing hole groups and around the lands, the screen being comprised of a bypass holes inside the outer edge but outside the granule dispensing hole groups and outside the lands, the by-pass holes being distributed around the outer edge and configured to provide to a pathway through the screen to granules that do not pass through a granule dispensing hole group.

6. The dispenser of claim 3, wherein the land area is comprised of openings in the screen too small for granules to pass through them.

7. The dispenser of claim 1, further comprised of an actuator operably coupled to the disc the actuator effectuating angular displacement of the disc about the axis.

8. The dispenser of claim 7, wherein the actuator is provided at least one hinge pin, substantially orthogonal to the axis of rotation, and wherein the actuator includes a first part that extends away from the hinge pin under the handle, and a second part of which extends downwardly from the hinge pin and which is operatively coupled to the disc,
whereby squeezing the handle actuator upwardly effectuates rotation of the disc, about its axis.

9. The dispenser of claim 8 further comprised of an actuator return spring.

10. The dispenser of claim 9, wherein the actuator return spring is at least one of:
a leaf spring, a torsion bar, and a coil spring.

11. A dispenser for dispensing granules, the dispenser comprised of:
a base having a substantially cylindrical interior surface and, a hopper-locating slot formed into the interior surface;
a rotatable granule measuring disc (disc) inside the base and configured to be able to rotate inside the base around an axis of rotation between first and second positions defined by a first angle between them, the disc comprised of:
a top surface and a bottom surface bounded by a perimeter;
a thickness defined by a separation distance between the top and bottom surfaces;
a plurality of voids (disc voids) angularly equidistant from each other around the axis of rotation and angularly separated from each other by the first angle, each disc void having an area;
a rim extending upwardly from the top surface at the perimeter, the rim being configured to engage the interior surface of the base and to surround the disc voids;
a pliable gasket attached to the top surface of the disc and inside the rim, the gasket being comprised of:
a top surface facing away from the top surface of the disc;
a thickness; and
a plurality of voids (gasket voids), angularly equidistant from each other around the axis of rotation and angularly separated from each other by the first angle, each gasket void having an area
a granule hopper coupled to the base and located above the top surface of the gasket, the hopper having:
a base engagement tab configured to mate with the hopper locating slot;
a plurality of hopper through-holes, extending through a bottom of the base, through which granules can pass, the hopper though-holes angularly equidistant from each other around the axis of rotation and which are angularly separated from each other by the first angle;
a screen coupled to the base and located below the disc, the screen having a plurality of screen dispensing through-holes, through which granules are dispensed, the screen dispensing through holes being arranged into a plurality of screen dispensing through hole groups, the screen dispensing through hole groups being defined by a land area between adjacent screen dispensing through hole groups, a land area being an area through which granules are unable to pass, the screen dispensing through hole groups being angularly equidistant from each other around the axis of rotation and angularly separated from each other by the first angle, the land areas being angularly equidistant from each other around the axis of rotation and angularly separated from each other by the first angle;
whereby the disc, gasket, hopper and base are configured such that, when the hopper locating slot and the base engagement tab are engaged to each other, and the disc is in the first position, disc voids and gasket voids are under corresponding hopper through-holes and above lands in the screen; and
whereby, rotation of the disc about its axis of rotation, moves the disc voids and the gasket voids away from the hopper through holes as pliable gasket closes the plurality of hopper through-holes to the second position whereat disc voids and gasket voids are over dispensing hole groups of the screen.

12. The dispenser of claim 11, further comprising:
a handle, operatively coupled to said base.

13. The dispenser of claim 12, further comprised of an actuator, operatively coupled between the handle and the disc, the actuator being configured such that vertical operation of the actuator effectuates rotation of the disc inside the base.

14. The dispenser of claim 11, wherein the land is an un-perforated area between first and second groups of screen dispensing through-holes.

15. The dispenser of claim 14, wherein the screen is circular and wherein the screen includes a plurality of evenly-spaced by-pass through-holes, just inside the rim and outside the groups of screen dispensing through holes.

16. The dispenser of claim 15, wherein the plurality of by-pass holes are evenly distributed about the axis of rotation.

17. The dispenser of claim 13 further including an actuator return spring, configured to return the rotatable member from the second position to the first position.

18. The dispenser of claim 16, wherein the return spring is operatively coupled between the actuator and the handle.

19. The dispenser of claim 18, wherein the return spring is at least one of:
a leaf spring;
a torsion spring;
a coil spring; and
a constant force spring.

* * * * *